(12) United States Patent
Vance

(10) Patent No.: US 6,267,672 B1
(45) Date of Patent: Jul. 31, 2001

(54) PRODUCT SALES ENHANCING INTERNET GAME SYSTEM

(75) Inventor: Christopher Michael Vance, Mesa, AZ (US)

(73) Assignee: Ayecon Entertainment, L.L.C., Mesa, AZ (US)

( * ) Notice: Subject to any disclaimer, the term of this patent is extended or adjusted under 35 U.S.C. 154(b) by 0 days.

(21) Appl. No.: 09/176,135

(22) Filed: Oct. 21, 1998

(51) Int. Cl.[7] ......................................................... A63F 9/24
(52) U.S. Cl. ................................. 463/29; 463/40; 705/14
(58) Field of Search ..................................... 463/1, 25, 29, 463/30, 36, 40–42, 16–20, 12–13; 434/307 R, 308, 236, 237; 273/138.2, 139, 143 R, 292, 293, 459, 460, 461; 235/375, 380, 381, 382; 700/91–93; 705/14, 16–18, 21, 23, 26–27, 35, 39, 41, 44

(56) References Cited

U.S. PATENT DOCUMENTS

| | | |
|---|---|---|
| 3,233,770 | 2/1966 | Waters . |
| 3,257,021 | 6/1966 | Brockett . |
| 3,581,690 | 6/1971 | Zapata . |
| 4,151,924 | 5/1979 | Jameson . |
| 4,157,143 | 6/1979 | Doi . |
| 4,165,009 | 8/1979 | Murayama . |
| 4,203,240 | 5/1980 | Goodwin . |
| 4,372,457 | 2/1983 | Kunimoto et al. . |
| 4,684,426 | 8/1987 | Takayama . |
| 4,845,739 * | 7/1989 | Katz . |
| 4,922,522 * | 5/1990 | Scanlon .................................. 463/17 |
| 4,996,705 * | 2/1991 | Entenmann et al. .................... 463/17 |
| 5,007,641 * | 4/1991 | Seidman ................................. 463/25 |
| 5,051,822 * | 9/1991 | Rhoades ................................. 463/29 |
| 5,056,681 | 10/1991 | Howes . |
| 5,083,271 * | 1/1992 | Thacher et al. ........................ 463/42 |
| 5,231,568 * | 7/1993 | Cohen et al. ........................... 463/29 |
| 5,462,278 | 10/1995 | Valyi . |
| 5,679,075 | 10/1997 | Forrest et al. . |
| 5,679,077 | 10/1997 | Pocock et al. . |
| 5,683,090 | 11/1997 | Zeile et al. . |
| 5,772,213 | 6/1998 | McGlew . |
| 5,774,870 | 6/1998 | Storey . |
| 5,779,549 * | 7/1998 | Walker et al. ......................... 463/29 |
| 5,823,879 * | 10/1998 | Goldberg et al. ...................... 463/42 |
| 5,848,396 * | 12/1998 | Gerace ................................... 705/10 |
| 5,855,008 * | 12/1998 | Goldhaber et al. .................... 705/14 |
| 5,915,243 * | 6/1999 | Smolen .................................. 705/14 |
| 5,933,811 * | 8/1999 | Angles et al. ......................... 705/14 |
| 5,941,772 * | 8/1999 | Paige ..................................... 463/20 |

(List continued on next page.)

OTHER PUBLICATIONS

"Ads Begin To Pop Up In CD–Roms, Games; Ads begin in video and games and CD–Rom", BPI Communications, L.P. Billboard, 3 pages, Mar. 25, 1995.*

*Primary Examiner*—Mark Sager
(74) *Attorney, Agent, or Firm*—Schmeiser, Olsen & Watts LLP

(57) ABSTRACT

The present invention uses a remotely accessible game, such as an internet game, to encourage consumers to purchase a product. Consumers who purchase a product receive access information which the consumer may then use to access and participate in the remotely accessible game. The pleasure of participating in the game is in and of itself an incentive to consumers to purchase products. The remotely accessible game may comprise a plurality of levels of varying degrees of difficulty so that participating consumers may continue to be challenged as they gain mastery of the game. Consumers who access the remotely accessible game may become eligible for prizes. Further, the interactive nature of the remotely accessible game allows for the collection of valuable demographic and marketing information from consumers who participate in the game.

13 Claims, 4 Drawing Sheets

U.S. PATENT DOCUMENTS

| | | | |
|---|---|---|---|
| 5,950,173 | * 9/1999 | Perkowski | 235/375 |
| 5,984,367 | 11/1999 | Barnhart et al. | |
| 6,006,257 | * 12/1999 | Slezak | 709/219 |
| 6,009,410 | * 12/1999 | LeMole et al. | 709/14 |
| 6,009,412 | 12/1999 | Storey | |
| 6,009,458 | * 12/1999 | Hawkins et al. | 709/203 |
| 6,012,984 | * 1/2000 | Roseman | 463/42 |
| 6,038,598 | * 3/2000 | Danneels | 709/203 |

* cited by examiner

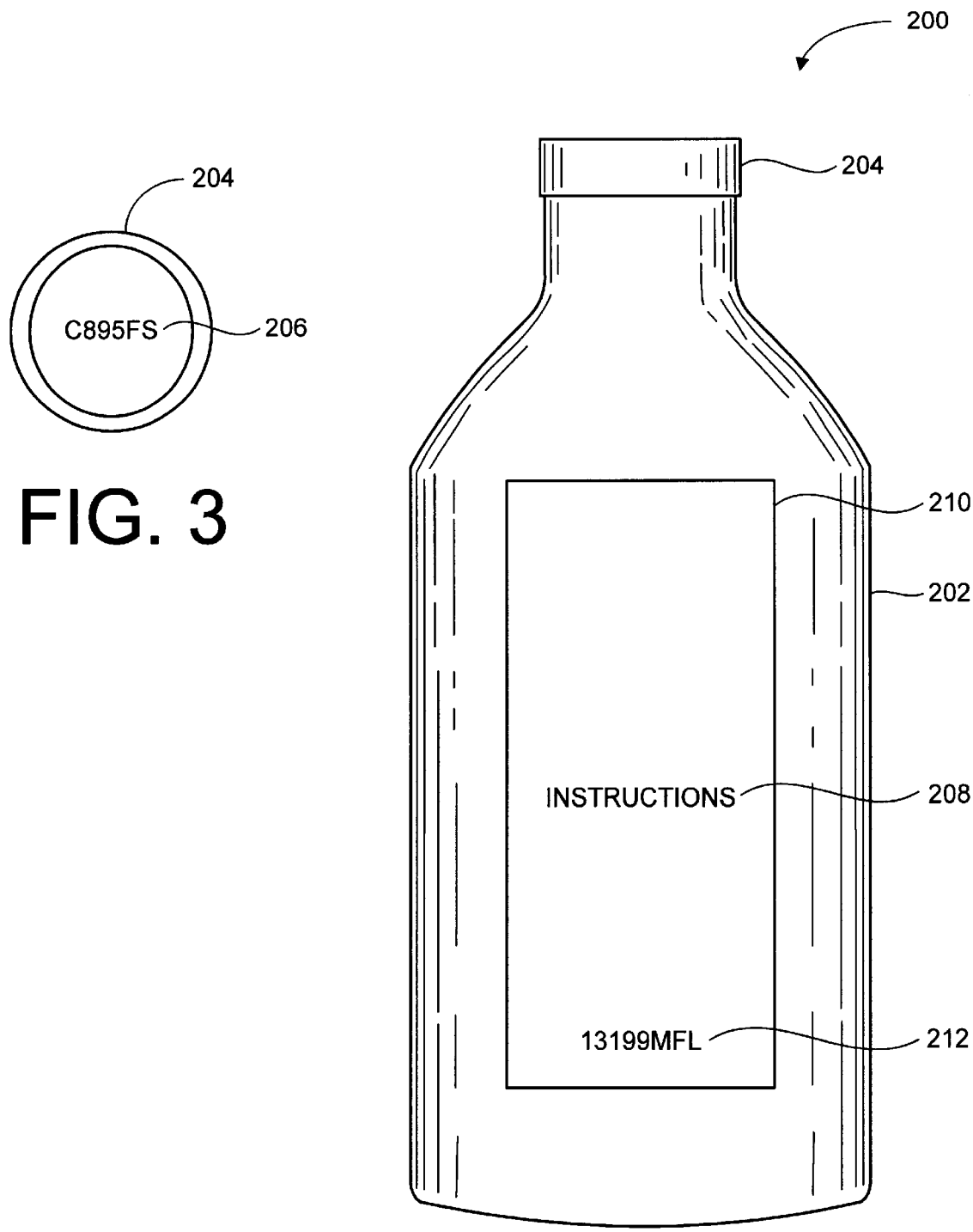

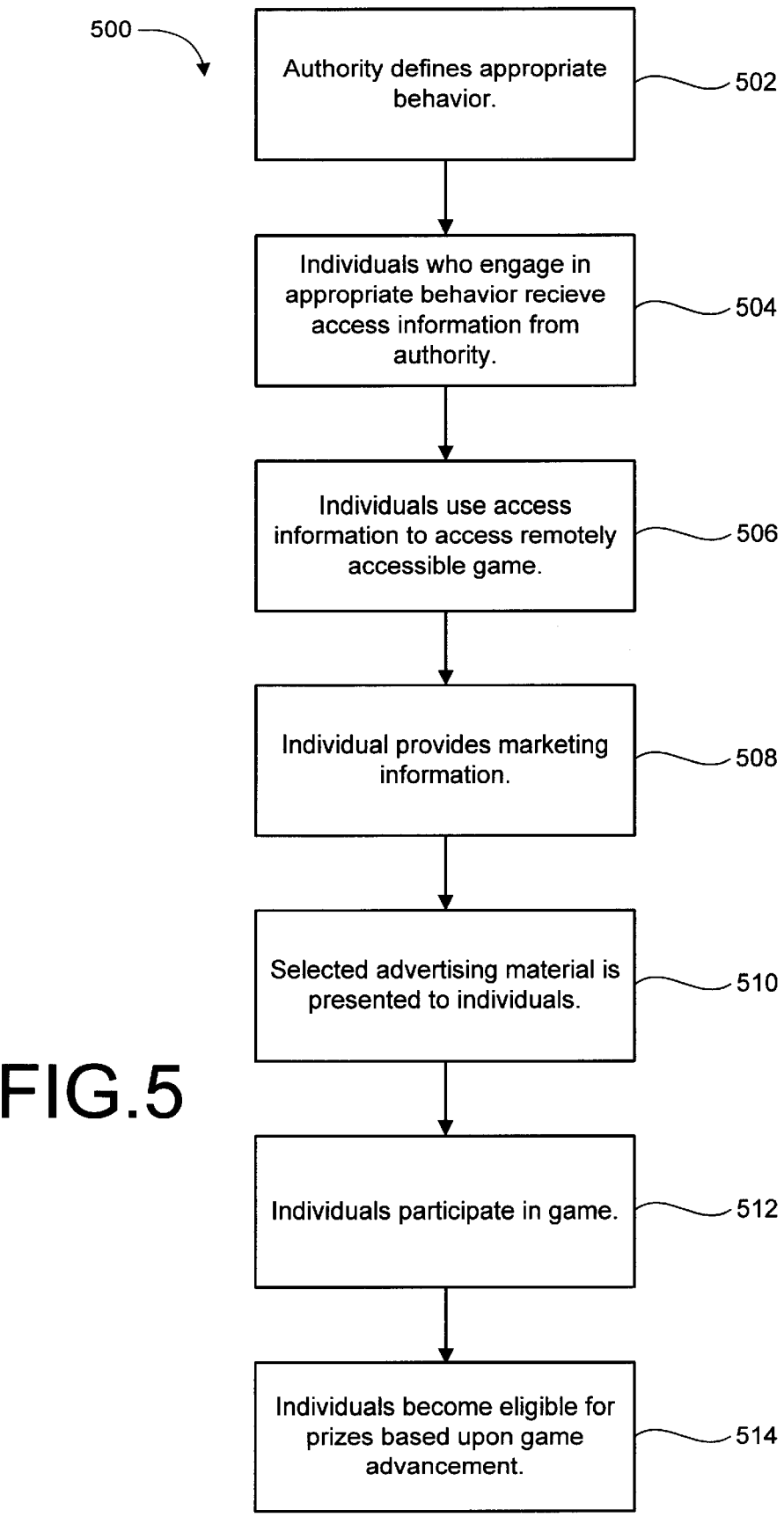

PRODUCT SALES ENHANCING INTERNET GAME SYSTEM

BACKGROUND OF THE INVENTION

I. Technical Field

This invention relates to remotely accessible games and the promotion and marketing of products. More particularly, this invention relates to the use of an internet gaming system accessed using information received through the purchase of products.

II. Background Art

Over the years, a wide variety of games and contests have been used to promote the sale of goods and services. For the purposes of this application, goods and services are collectively referred to as "product(s)" herein. Typically, a game or contest encourages consumers to purchase a particular product by giving the consumer a game piece or game token with each purchase. Generally, the possession of a particular game piece, or the correct combination of game pieces, will entitle the consumer to the receipt of a prize. Thus, the consumer is encouraged to purchase additional products to obtain additional chances to receive the winning game piece, or to collect additional pieces needed to complete a set of winning game pieces. Such game systems seek to generate excitement and enthusiasm amongst consumers of a particular product, generate additional sales of a product, and obtain new customers. One difficulty and danger with this approach is that it generates a win or lose attitude. After several purchases, none of which result in a win, the promotion can actually work in reverse. The purchase of a product equates to a negative game result in the mind of the consumer, with receipt of a losing game piece resulting in either the loss of a customer or in a customer making fewer purchases.

Furthermore, after using such a promotional tool several times, the uniqueness of the game wears off and interest dies out. Also, the promotional success of such games is largely determined by the value of the prizes available, in that more valuable prizes tend to generate more consumer enthusiasm for the game than do less valuable prizes. The actual participation in such games may offer some excitement, as in the collection and maintaining of a set of game pieces, but offers little positive feedback for consumers as the game progresses. Recognizing this shortcoming, some companies have guaranteed prizes with each purchase. For example, fast food restaurants generally offer a toy with the purchase of certain child-oriented meals. In such situations the sales can rise or fall depending upon whether your particular toy is in greater demand than the toys being distributed by other fast food vendors. Also, parents often try to avoid these purchases due to a proliferation of small, mostly useless, toys that end up broken, lost or, at best, cluttering the entire home.

Other promotions offer collector type items with the purchase of a threshold amount of products. For example, a twelve (12) ounce drinking glass imprinted with an NFL team logo with the purchase of 10 gallons of gas or more. Once again, while the initial promotion may be interesting, one can only collect so many glasses or other such items until the offer fails to motivate customers to make additional purchases.

In each of these situations the promotion is based upon the end product or the give away. For this reason the aforementioned problems occur and the promotions fail to involve the purchaser to any significant degree. Furthermore, the need to develop, manufacture, ship and distribute promotional items is always a challenge, and failing to have an anticipated item available is detrimental to customer relations. Accordingly, the need exists for a gaming system that is sufficiently entertaining that the opportunity to participate in the game alone encourages consumers to purchase products. In the subject invention this may be accomplished by utilizing the internet.

The internet is frequently used as a media in which to advertise and promote certain products. Promotion on the internet presently takes two major forms. First, companies or products may have their own "website" wherein the virtues of a company and its products are put forth to the potential consumer. To encourage website activity the sites are generally advertised or listed on a company's products. Alternatively, websites can be creatively developed in order to maximize the likelihood that the website will be cited when certain key words are used to search on one of the many available internet search engines. Second, a product may be advertised on other websites. For example, numerous websites exist which are frequently accessed by potential consumers for entertainment or educational purposes, and an advertisement placed on these websites (typically for a fee) may be successful in prompting a consumer to purchase a particular product. Such advertisements may be likened to similar advertisements in print, television or radio. When using this type of advertising the primary issue is the number of "hits" a particular site receives. Of equal importance, but generally less available, is the demographics of those who use the site.

By acquiring information about a particular product's purchasers one can make better informed and therefore more successfull advertising decisions. This can be accomplished by comparing product and advertising demographics to target specific groups likely to become purchasers.

While website advertising and demographic studies are well known in the art, they have not been utilized in combination with a remote access game and product marketing tool.

The subject invention overcomes many of the problems encountered with other promotional games and utilizes the internet and demographic information gathering to achieve a comprehensive system not previously obtainable.

DISCLOSURE OF INVENTION

The present invention uses a remotely accessible game to promote the sales of products by allowing consumers who obtain access information from the acquisition of a product to access the game. By contingenting access to an interactive game upon product purchases, the subject invention develops myriad relational scenarios. Since the playing of the game itself is enjoyable, all purchasers are winners. By providing interactive games of various skill levels with the possibility of moving from level to level, the purchaser finds enjoyment as well as a challenge. This combination is one that people do not quickly tire of, as a determination and commitment to overcome the challenge often accompanies game play. Since each new level or game can incorporate an almost endless variety of strategies, challenges and game dynamics, changes to the game will result in a continued excitement and interest from consumers. By periodically changing games or adding new games, consumer apathy and boredom is avoided.

By limiting the length of access obtainable through the use of a code on the purchaser's product, continued sales are greatly enhanced. Furthermore, in addition to requiring the code be entered to obtain access to the game, demographic information about the purchaser and the product may also be required. This information may be used to track product sales as well as map out the characteristics of purchasers and game players. The later information is extremely valuable to those who would consider advertising on the web site.

In addition to the entertainment and amusement of participating in the game, participating consumers are eligible for prizes to be determined either through random selection or based upon their advancement through the game. As an encouragement to move up from one level to the next, one embodiment calls for increased prize levels corresponding to increased levels of game advancement.

It is also possible to have players register at each level. In this way, the demographics of each group can be ascertained. One value of this is related to advertising for the companies that are providing the promotional items. As a player moves to higher levels the prize values increase and the companies providing those prize items can also advertise themselves. Of course, links can be created so that a person can quickly connect to an advertiser's web site. Therefore, as these games progress, demographic information can be acquired. That information can be used to determine what prizes should be offered next. Companies who manufacture or distribute such prizes and have product lines which make it desirable for them to target advertising to the playing group, as evaluated from the demographic information, can also advertise at the desired game level. From the players point of view, they can investigate more fully the prizes they are playing for, and can become familiar with the companies' products and prices.

In an alternative approach each participant could be an initial winner by receiving a small gift or, as preferred, a prepaid phone card. These phone cards or other gifts may be "collectors items" which feature photographs of sports stars or other insignia that cause their value to exceed their physical attributes. Each phone card could have a scratch off secret pin number on one side. The pin number on the card can serve as an access code or as an identifier to be used to enroll the user into a prize drawing and then to confirm the identity of the winner. By purchasing a predetermined amount of additional time on the card, which involves giving the pin number and payment to the card service provider, a user would be entered into another drawing or obtain additional access to the game. With each recharge of the minimum requirement, generally sixty minutes, another entry is made in the drawing and/or additional game access is granted.

As discussed above, the subject invention is truly interactive. The user can enjoy the product or service purchased, be challenged by participating in the website game(s), have the opportunity to win desirable prizes, and come to know more about the prize sponsors and other product lines which they find interesting.

Furthermore, depending upon the products and services purchased to obtain website access, this system can be an invaluable source of encouragement. Codes could be put on health foods or related items such as spring water or herb based drinks. Services such as dentists or even schools could distribute codes as an incentive for making office visits or performing good work. Access codes could be sold directly or used by parents or teachers as part of a reward program. Furthermore, these benefits can be accomplished without the need to ship and distribute countless toys. Also, there is virtually no disappointment for the user, since the entire process is enjoyable. As shown more fully hereafter, the subject invention overcomes the shortcomings of the prior art and provides an excellent interactive game system that can be used to great benefit to encourage certain purchases or behaviors.

BRIEF DESCRIPTION OF THE DRAWINGS

FIG. 2 is a perspective view of a product in accordance with the preferred embodiment of the invention; and FIG. 3 is a perspective view of access information in accordance with the preferred embodiment of the invention.

FIG. 5 is a flow diagram of a method in accordance with a third embodiment of the invention.

BEST MODE FOR CARRYING OUT THE INVENTION

The present invention provides an improved method of promoting products or behavior by allowing consumers of a product to enter a remotely accessible game system. According to the preferred embodiment of the present invention, a consumer who purchases a product will receive access information allowing the consumer to access an internet game. Having accessed the internet game, the consumer is rewarded for his or her purchase by the pleasure and entertainment of participating in the game. Moreover, the consumer who accesses the game will be eligible to receive prizes. The game may contain a plurality of successively higher levels, in which case the completion of successively higher levels will make the consumer eligible for successively more valuable prizes.

According to the second exemplary embodiment many, possibly all, consumers who access the Internet game will receive a small prize, such as a prepaid telephone calling card. By purchasing predetermined additional amounts of time, the consumer would become eligible for further prize drawings or receive additional access to the Internet game.

According to the third exemplary embodiment, access to the Internet game may be used to reward certain behavior. For example, students who demonstrate good behavior in school might receive an access code granting them a predetermined amount of access to the Internet game.

Figure 1:
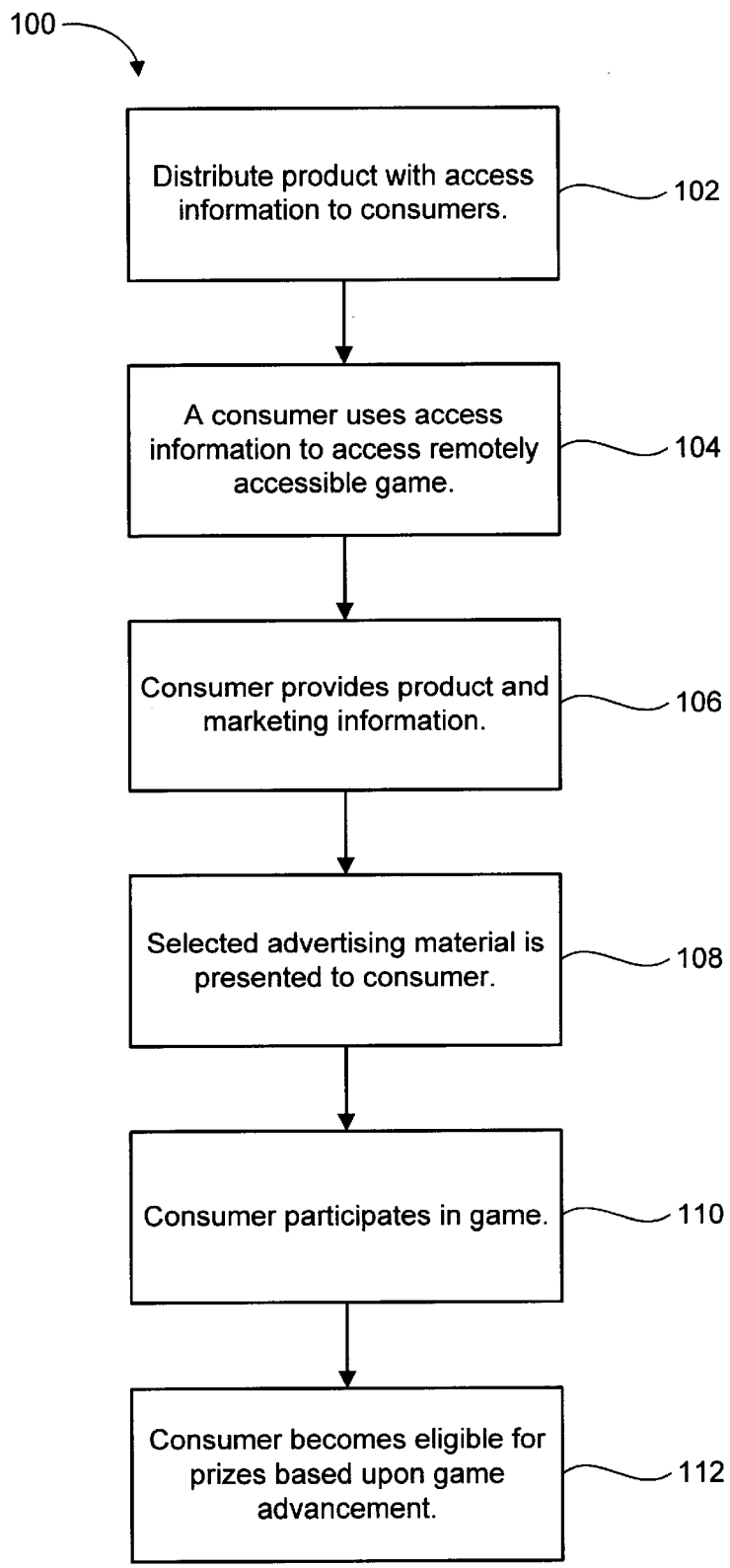
FIG. 1 is a flow diagram of a method in accordance with the preferred embodiment of the invention.

Referring now to FIG. 1, a method 100 in accordance with the preferred embodiment is illustrated. In step 102 products and access information are distributed to consumers. If the product is a tangible good, the access information may be placed on the product itself. Some goods are not easily susceptible to having access information physically placed upon them, in which case the access information may be placed upon product packaging. When the product is a service, the access information may be provided in conjunction with the rendering of the service, although not necessarily at the same time and place the service was rendered. Even when the product is tangible, it may be necessary or desirable in some circumstances to provide the access information in conjunction with the receipt of the product, rather than placing it on the product or product packaging. Preferably, the access information is provided in a way such that it may be perceived only after purchasing a product. For instance, access information may be placed on the inside of the product packaging, so that it may be obtained only upon opening the product.

The access information itself may take a variety of forms. Preferably, the access information is an access code which, when entered into the game system by the consumer, allows the consumer to access the game. An access code will typically consist of a string of alphanumeric characters. The use of an access code is particularly desirable because most consumers are already familiar with the use of passwords to access systems such as automated teller machines and computer networks. Password technology may be readily used in conjunction with an access code in accordance with the preferred embodiment of the present invention.

While the preferred embodiment uses an access code, the access information may take other forms. For instance, the access information could instruct the consumer to manipulate items or icons on a computer screen in a given way. The proper manipulation of these items would then grant the consumer access to the remotely accessible game. The access information might also consist of answers to questions that will be posed to the consumer prior to granting access to the remotely accessible game. Ones skilled in the art will immediately realize that a wide variety of access information may be used in accordance with the invention.

In step 104 the consumer uses the access information to access the remotely accessible game. The remotely accessible game is preferably a computer game accessible via the internet. Of course, other types of remotely accessible games are possible and may be used in conjunction with the present invention. For instance, a game may be played over the telephone by providing responses using the telephone key pad. Likewise, a computer may be utilized in a direct dial-up of another computer to play a game without using the internet itself. Once again, those skilled in the art will realize that there exists a wide variety of possible remotely accessible games suitable for use in conjunction with the present invention.

In the next step 106 product and marketing information is provided by the consumer. Product information may be obtained in a variety of ways. For instance, the consumer may be required to input information regarding the product he or she acquired in order to access the game. This product information might include the date and location of the product purchase. Information might also be obtainable regarding the date of production of a product and its source. It may sometimes be possible and desirable to require the consumer to input a product code contained on the product such that the producer's records may be used to reveal information about the particular product purchased. Alternatively, the access information provided with a product may be designed to be unique to that product, thus allowing the producer to know which product was obtained by the consumer inputting the access information.

A further advantage of the present invention is that, unlike traditional promotional games, it allows for the collection of important marketing information from the consumer. This marketing information may be used to enhance product development and marketing efforts in the future. Marketing information may be collected by requiring the consumer to enter the desired information prior to accessing the game. The exact nature of this information will vary depending upon the needs of the producer. Likely consumer and marketing information to gather includes the age and gender of the consumer, the consumer's income, the consumer's place of residence, and the consumer's educational level. Once again, those skilled in the art will realize that a wide variety of information might be sought depending upon the exact needs of the producers and marketers of the product.

In the next step 108 the consumer who has accessed the remotely accessible game receives advertising information. This step 108 may actually be placed at any point in the sequence of method 100 and, in fact, may occur at multiple times or even throughout the method 100. This step 108 consists of allowing the producer or a third party to place commercial messages such that they will be perceived by a consumer who is participating in or accessing the game. Advertisers could include companies that are sponsoring prizes. The Internet game site may preferably contain links allowing the user to connect to the websites of those who sponsor particular prizes, or other advertisers. Additional game time may be granted for the first time a user links to a sponsors web site.

In the next step 110 the consumer participates in the remotely accessible game. A wide variety of games exist that may be used for this purpose. Preferably, the game is a computer game accessed via the internet. The game may consist of a plurality of levels of varying degrees of difficulty, or may even contain a plurality of unrelated sub-games. A wide variety of such games already exist, and these may be adapted to the purposes of the present invention. Obviously, new computer games are being developed on an almost daily basis. Virtually any of these games may be adapted for use with the present invention. Furthermore, specialized games may be developed for use with the present invention. It is to be noted that one may reasonably expect that optimal results from the method in accordance with the invention will be obtained if some effort is made to select a remotely accessible game that is well suited to the desires and interests of the consumers of a particular product. Thus, different products that are promoted in accordance with the present invention will likely utilize differing games, depending upon the wants and desires of the consumers of those products.

In the next step 112 the consumers who have accessed the game become eligible for prizes. Prize eligibility and receipt may be determined in a number of ways. According to the preferred embodiment, all consumers who access the game become eligible for the receipt of a prize. The recipient of the prize may be randomly selected from those who have accessed the game. In accordance with the preferred embodiment, consumers who advance to successively more difficult game levels are eligible for successively more valuable prizes. In this way, the consumer is encouraged to participate frequently in the game and increase his or her skill level, so as to proceed further through the game levels and be eligible for more valuable prizes. Of course, the prize eligibility may be governed in any of a number of ways. For instance, all consumers who access the game might receive a prize or gift. Prizes could be distributed without regard to level advancement, or might be distributed in a way other than randomly. To prevent dishonest consumers from fraudulently claiming prizes, a consumer can be required to submit his or her access information prior to receiving the prize.

The present invention is particularly adapted to use in promoting bottled beverages. Referring now to FIGS. 2–3, in accordance with the preferred embodiment the bottled beverage 200 includes a bottle 202 and a cap 204. The access information in this case is an access code 206 which may located, for example, on the label 210 or inside of the cap 204. If the access code 206 is placed on the cap 206, the access code 206 may be obtained only after the beverage 200 is opened. If the access code 206 is placed on the label 210, the access code 206 and label 210 may be easily submitted, for example via the mail, to verify a consumer's entitlement to a prize. By using the access code 206, possibly in connection with additional information printed on the label of the bottle, a consumer is entitled to a predetermined amount of time of participation in the Internet game. If deemed necessary, instructions 208 as to how to access the remotely accessible game may be included on a label 210 affixed to the bottle 202. The label 210 may also include product information 212. In the case of a bottled beverage 200, product information might appropriately comprise a code designating the date and location of bottling. By following the instructions 208 provided on the label 210 and entering the appropriate access code 206, the consumer is rewarded for his or her purchase by the right to participate in the game. This right to participate in the game will, in an of itself, tend to encourage consumers to purchase products.

The access information provided with the product could be used to provide unlimited access to the game. However, such unlimited access may be less preferable would be ill advised, as there would remain no incentive to purchase additional products. For this reason, the preferred embodiment uses an access code and allows each access code to be used only once to access the game. The preferred embodiment also limits the time for which one access code may be used. In this way, a consumer may not enter one access code and continue to play the game for an indefinite period of time. Instead, the consumer must purchase additional products in order to obtain and enter an additional access code to participate in the game after the first access code has expired. In this way, consumers are encouraged to purchase additional products to obtain additional access codes and, hence, additional time to participate in the game. It should be noted that it is possible and sometimes advisable to allow longer periods of access for the purchasers of more expensive products. Thus, the access codes contained on the more expensive products could grant the consumer a greater amount of playing time than the access codes contained on the less expensive products.

Figure 4:
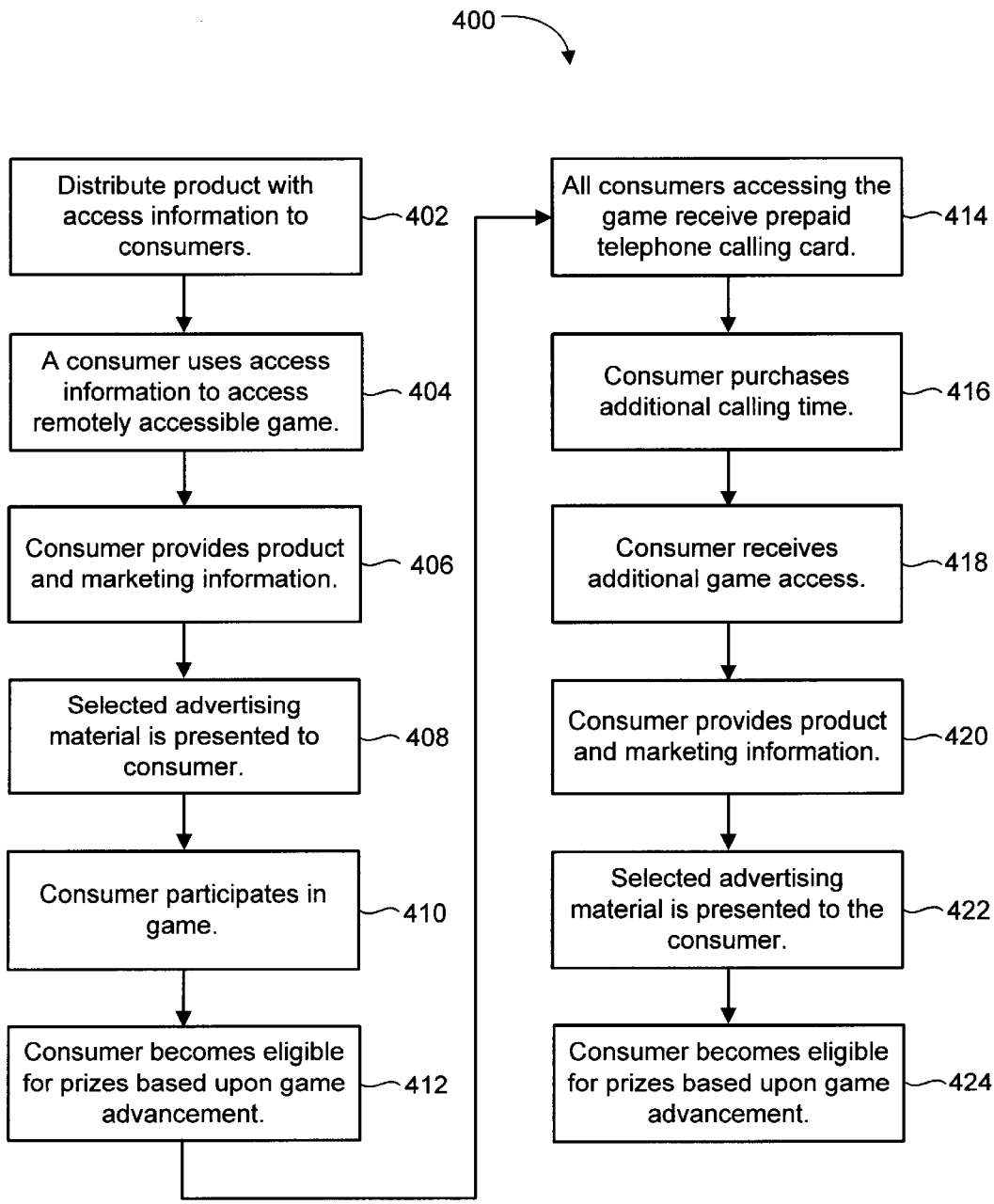
FIG. 4 is a flow diagram of a method in accordance with a second embodiment of the invention.

Referring now to FIG. 4, a method in accordance with a second exemplary embodiment is shown. The first step of method 400 is step 402 of distributing products and access information to consumers. In the next step 404 consumers access the remotely accessible game using the access information. In the next step 406 the consumer provides product and marketing information. For the next step 408, selected advertising material is presented to consumer. Next, in step 410, the consumer participates in the internet game. In step 412, the consumer becomes eligible for the receipt of prizes based upon game advancement. In step 414, many, possibly even all, consumers who access the game receive a small prize, preferably a prepaid telephone calling card. After receiving the prepaid telephone calling card, the consumer may choose to purchase additional calling minutes in step 416. Having purchased a predetermined amount of additional calling minutes, in step 418 the consumer either receives new access information or has the prior access information reactivated. Alternatively, at step 418, the consumer could become immediately eligible for a prize drawing or other incentive. Using this access information, the consumer may once again access the game in step 420. Having accessed the game, the next step 422 is to obtain marketing and product information from the consumer. Once again, in step 424, the consumer is exposed to selected advertising material. In step 426 the consumer may once again become eligible for prizes based upon game advancement. At any point in this process the consumer may decide to purchase additional calling card minutes, at which point the process resumes at step 416.

Referring now to FIG. 5, a method 500 in accordance with a third exemplary embodiment is shown. According to method 500 the present invention is used to encourage appropriate behavior, particularly amongst younger children. It is particularly envisioned that the present invention may be appropriately used by entities such as schools or dentists to encourage appropriate behavior in school or frequent dental checkups. The method 500 begins with step 502 in which the authority, be it school, dentist, parent or other authority figure, defines the appropriate conduct which will merit receipt of the reward. Next, in step 504 individuals who engage in the appropriate conduct will receive access information. In step 506 the individuals who have engaged in appropriate conduct may use the access information to gain access to the remotely accessible game. Step 508 is to gather marketing information from the individual accessing the game, although this step is optional. The next step 510 is also optional and consists of presenting advertising material to the individual participating in the game. In step 512 the individual participate in the game. Finally, in step 514, individuals participating in the game can optionally become eligible for the receipt of prizes based upon game advancement.

The present invention offers an improved method of using an internet game system to promote sales of products, or appropriate behavior. The present invention is particularly adapted to use of promoting sales of bottled beverages. By placing access information as an alphanumeric access code on the label or inside of the bottle cap, a purchasing consumer may use that access code to participate for a limited amount of time in a remotely accessible game via the internet. The pleasure of participating in the game is in and of itself an inducement to the consumer to purchase additional products. As an additional inducement to purchase the products, all who participate in the game will be eligible for the receipt of prizes. Those who successfully complete higher levels of the game will be eligible for successively more valuable prizes. By requiring product and marketing information from those who seek to access the game, a company may gain valuable information to aid it in future marketing and promotional activities. Further, by utilizing the advertising capabilities of the internet game site, the sponsoring company may advertise and promote its other products. Likewise, other companies may use the internet website to promote their own products, particularly if those companies are sponsoring some or all of the prizes available to those who participate in the game. This system provides numerous incentives to encourage consumers to purchase particular products.

While the above invention has been disclosed for particularized use in conjunction with bottled beverages, it is to be appreciated that it may be used in elation to virtually any good or service without departing from the spirit from the invention. The invention is preferably used with an internet game, but may be used in connection with any of a variety of remotely accessible games. The actual game used may be any of an almost endless variety. The actual prizes used may vary depending upon the budget allocated for prizes, the interests of the target group, and the like. Those skilled in the art will realize that there are numerous other variations that fall within the scope of the present invention.

What is claimed is:

1. A method for promoting the sale of products comprising the steps of:

(A) distributing products to consumers;

(B) providing the consumers with access codes in conjunction with distributing the products to the consumers;

(C) providing a computer game accessible via a computer network;

(D) allowing consumers who input an access code into the computer game to participate in the computer game;

(E) collecting marketing information from consumers participating in the computer game (F) limiting the amount of time that consumers can participate in the computer game for each code that is provided, whereby consumers are encouraged to purchase more products to get more codes.

2. The method of claim 1 further comprising the step of:

(F) providing a prize to all consumers who access the computer game.

3. The method of claim 2 wherein the internet game comprises a plurality of successive levels.

4. The method of claim 3 further comprising the step of:

(G) randomly selecting consumers who complete successively higher levels to receive successively more valuable prizes.

5. The method of claim 4 further comprising the step of:

(H) presenting advertising material to consumers participating in the computer game.

6. The method of claim 5 wherein the advertising material includes links to an advertiser.

7. The method of claim 1, wherein the step of providing the consumers with access codes comprises tangibly concealably fixing the codes whereby the codes cannot be viewed by the consumers until after the product has been purchased.

8. The method of claim 7, wherein the step of collecting marketing information comprises requiring consumers to enter desired marketing information prior to allowing such consumers to participate in the computer game.

9. The method of claim 7, wherein the step of tangibly fixing the codes comprises attaching the codes to the products.

10. The method of claim 1 wherein the step of limiting the amount of time that consumers can participate in the computer game comprises allowing longer periods of access for access codes provided in conjunction with products that are more expensive than other products which would not allow as long a period of access.

11. The method of claim 1 further comprising receiving product information from the access code.

12. The method of claim 11 wherein there are a plurality of computer games accessible and further comprising the step of directing the consumer to preselected games depending upon the product purchased for which the access code was provided.

13. The method of claim 1 further comprising the steps of:

(G) Presenting advertising material including links to an advertiser; and (H) granting additional game time access the first time a consumer links that advertiser.

\* \* \* \* \*